(12) United States Patent
Ono et al.

(10) Patent No.: US 9,940,961 B2
(45) Date of Patent: Apr. 10, 2018

(54) PERPENDICULAR MAGNETIC RECORDING MEDIUM

(71) Applicant: FUJI ELECTRIC CO., LTD., Kawasaki-shi (JP)

(72) Inventors: Takuya Ono, Matsumoto (JP); Takehito Shimatsu, Natori (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 269 days.

(21) Appl. No.: 14/680,024

(22) Filed: Apr. 6, 2015

(65) Prior Publication Data

US 2015/0213821 A1  Jul. 30, 2015

Related U.S. Application Data

(63) Continuation of application No. PCT/JP2013/007199, filed on Dec. 6, 2013.

(30) Foreign Application Priority Data

Dec. 6, 2012 (JP) .................................. 2012-267589
May 8, 2013 (JP) .................................. 2013-098390

(51) Int. Cl.
    *G11B 5/66* (2006.01)
    *G11B 5/65* (2006.01)

(52) U.S. Cl.
    CPC . *G11B 5/65* (2013.01); *G11B 5/66* (2013.01)

(58) Field of Classification Search
    CPC .................................... G11B 5/65; G11B 5/66
    See application file for complete search history.

(56) References Cited

U.S. PATENT DOCUMENTS

| 2004/0033339 | A1 | 2/2004 | Fukutani et al. |
| 2006/0280862 | A1 | 12/2006 | Yasui et al. |
| 2010/0055503 | A1 | 3/2010 | Shimatsu et al. |

(Continued)

FOREIGN PATENT DOCUMENTS

| CN | 102385871 A | 3/2012 |
| JP | 2001-351217 | 12/2001 |

(Continued)

OTHER PUBLICATIONS

R. F. Penoyer, "Automatic Torque Balance for Magnetic Anisotropy Measurements", The Review of Scientific Instruments, vol. 30, No. 8, pp. 711-714 (Aug. 1959).

(Continued)

*Primary Examiner* — Holly Rickman
(74) *Attorney, Agent, or Firm* — Rabin & Berdo, P.C.

(57) ABSTRACT

A perpendicular magnetic recording medium includes a non-magnetic substrate; and a magnetic recording layer that includes magnetic crystal grains and a non-magnetic crystal grain boundary that surrounds the magnetic crystal grains, wherein the magnetic crystal grains contain an ordered alloy and the non-magnetic crystal grain boundary contains Ge oxides. The magnetic recording layer may have a granular structure. The magnetic crystal grains may be micronized to be sufficiently ordered and separated, and the perpendicular magnetic recording medium may have a high magnetic anisotropy constant Ku and high coercivity Hc.

4 Claims, 4 Drawing Sheets

(56) References Cited

U.S. PATENT DOCUMENTS

| | | |
|---|---|---|
| 2010/0140727 A1 | 6/2010 | Shimatsu et al. |
| 2010/0255348 A1* | 10/2010 | Sato .......................... G11B 5/65 |
| | | 428/800 |
| 2012/0052330 A1 | 3/2012 | Takekuma et al. |
| 2012/0300600 A1 | 11/2012 | Kanbe et al. |

FOREIGN PATENT DOCUMENTS

| | | |
|---|---|---|
| JP | 2004-237429 | 8/2004 |
| JP | 2007-018688 | 1/2007 |
| JP | 2010/034182 | 2/2010 |
| JP | 2010-102816 | 5/2010 |
| JP | 2010-135610 | 6/2010 |
| JP | 2011-154746 | 8/2011 |
| JP | 2012-048784 | 3/2012 |
| WO | WO2014/087665 A1 * | 6/2014 |

OTHER PUBLICATIONS

Soshin Chikazumi, "Physics of Ferromagnetism", vol. II, pp. 10-21, Shokabo, Co., Ltd.

* cited by examiner

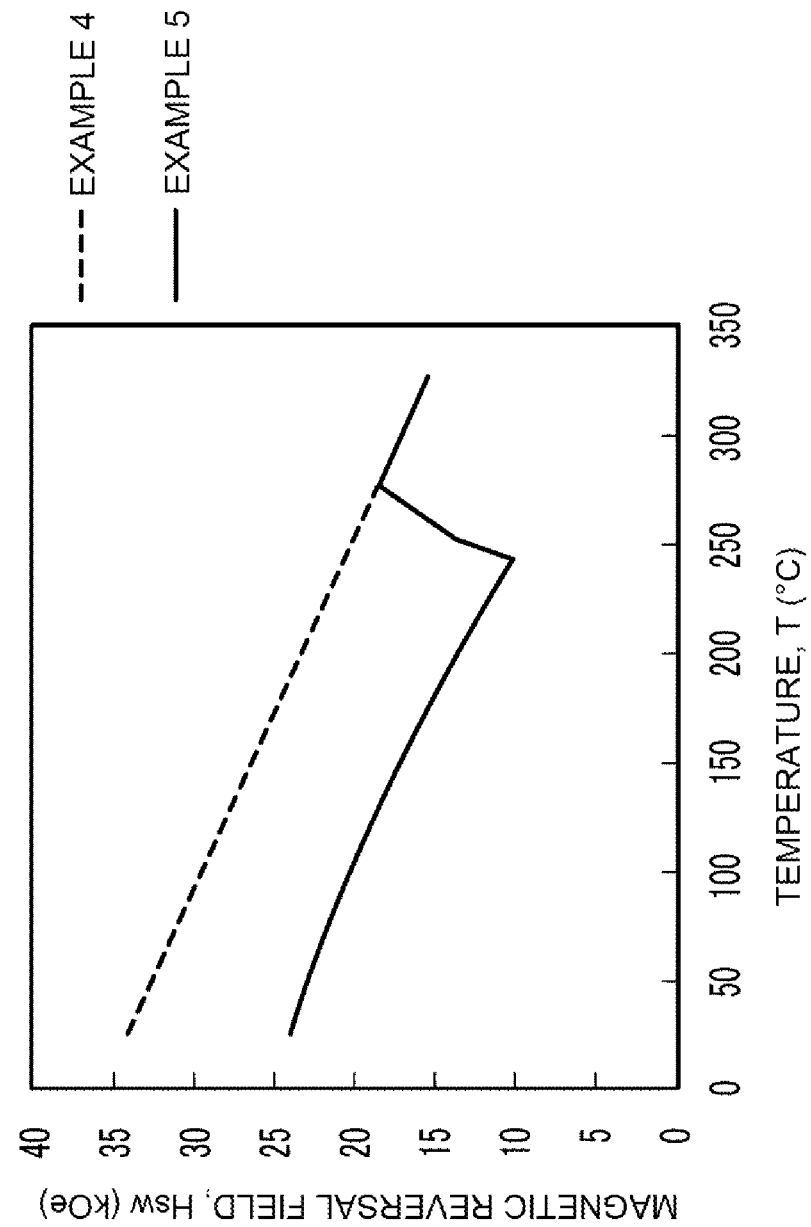

PERPENDICULAR MAGNETIC RECORDING MEDIUM

CROSS-REFERENCE TO RELATED APPLICATION(S)

This non-provisional application is a continuation of and claims the benefit of the priority of Applicant's earlier filed International Application No. PCT/JP2013/007199 filed Dec. 6, 2013, the entire contents of which are incorporated herein by reference.

BACKGROUND OF THE INVENTION

1. Field of the Invention

The present invention relates to a perpendicular magnetic recording medium and, more particularly, to a perpendicular magnetic recording medium that contains Ge oxides.

2. Background of the Related Art

Conventionally, a perpendicular magnetic recording scheme for realizing perpendicular magnetization of a surface of a magnetic recording layer (magnetization film) of a magnetic recording medium has been used as a recording scheme of magnetic recording apparatuses. A magnetic recording medium used in the perpendicular magnetic recording (hereinafter perpendicular magnetic recording medium) includes a non-magnetic substrate, a magnetic recording layer formed from a magnetic material, and the like.

In order to improve recording density of a perpendicular magnetic recording medium, the properties thereof have been changed and improved continuously. A main change or improvement is a gradual reduction in the size of magnetic crystal grains that form the magnetic recording layer. As a result, the size of state-of-the-art magnetic crystal grains approaches the physical limit called a superparamagnetic limit in which magnetization cannot be maintained stably due to the influence of ambient heat.

Thermal stability of perpendicular magnetic recording media can be improved by a magnetic recording layer formed from a material having strong magnetic anisotropy. A thermal stability index of perpendicular magnetic recording media is represented by $KuV/k_bT$ where Ku is a magnetic anisotropy constant, V is volume of a magnetic crystal grain, $k_b$ is the Boltzmann constant, and T is an absolute temperature. It is estimated that $KuV/K_bT$ needs to be 60 or more in order for recorded information to be maintained for ten years. As a method for solving the superparamagnetic limit problem, it has been deemed appropriate to use a material having a high magnetic anisotropy constant Ku.

Further, as a scheme for increasing the density of a magnetic recording layer, a method of using a granular structure in which a magnetic crystal grain is surrounded by a non-magnetic crystal grain boundary, such as an oxide or a nitride, has been proposed.

Japanese Patent Application Publication No. 2010-135610 (Patent Literature 1) discloses a structure in which a non-magnetic material is interposed between crystal grains of an alloy to form a granular film as a magnetic thin film. Examples of the non-magnetic material used for forming the granular film include $SiO_2$, $Cr_2O_3$, $ZrO_2$, and $Al_2O_3$. These non-magnetic materials are highly likely to magnetically separate crystal grains of Co—Pt—C-based alloys.

Japanese Patent Application Publication No. 2010-34182 (Patent Literature 2) discloses a magnetic thin film having a granular structure. This granular structure includes a ferromagnetic crystal grain mainly composed of a Co-M-Pt alloy (where M represents one or a plurality of metal elements other than Co and Pt) having an ordered structure of atoms called a $L1_1$-type and a non-magnetic grain boundary surrounding the magnetic crystal grain. The alloy is an ordered alloy based on the three elements Co, Fe, and Pt having a granular structure.

In a magnetic recording layer having such a granular structure, the non-magnetic crystal grain boundary physically separates magnetic crystal grains to reduce magnetic interaction between the magnetic crystal grains. Reduction in magnetic interaction suppresses formation of a zigzag magnetic wall occurring in a transition region of recording units to realize low-noise properties.

When a magnetic recording layer having a granular structure is formed using a conventional non-magnetic non-metallic material, the magnetic anisotropy constant and coercivity of the perpendicular magnetic recording medium are not satisfactory. For example, conventionally, materials such as $SiO_2$ and $TiO_2$ have been used for granularizing an ordered alloy of FePt or the like. However, these materials could not sufficiently create an ordered structure of the alloy and separate grains, and the magnetic anisotropy and coercivity thereof were decreased. Thus, a novel perpendicular magnetic recording medium having particularly high magnetic properties continues to be desired.

Moreover, a perpendicular magnetic recording layer in which an FePt-based ordered alloy is granularized has various problems. For example, the coercivity is high and the temperature at which heat-assisted recording is performed increases, and a magnetic reversal field gradient decreases when data is recorded at high temperature.

The present invention has been made in view of the above-described challenges and an object thereof is to provide a perpendicular magnetic recording medium in which magnetic crystal grains are sufficiently ordered and separated, and which has a high magnetic anisotropy constant.

Another object of the present invention is to provide a perpendicular magnetic recording medium having high coercivity in a room-temperature region in which recorded data is preserved.

Another object of the present invention is to provide a perpendicular magnetic recording medium capable of decreasing a magnetic reversal field in a high-temperature region in which data is recorded.

Another object of the present invention is to provide a perpendicular magnetic recording medium capable of increasing a temperature gradient of a magnetic reversal field in a high-temperature region in which data is recorded.

SUMMARY OF THE INVENTION

An example of means for achieving the objects of the present invention is providing a perpendicular magnetic recording medium, comprising a non-magnetic substrate; and a magnetic recording layer having a granular structure that includes magnetic crystal grains and a non-magnetic crystal grain boundary that surrounds the magnetic crystal grains, wherein the magnetic crystal grains contain an ordered alloy and the non-magnetic crystal grain boundary contains Ge oxides.

Here, the non-magnetic crystal grain boundary may further contain at least one oxide selected from the group consisting of Mn oxides, Si oxides, Al oxides, Zn oxides, B oxides, and Ti oxides. Moreover, the magnetic crystal grains preferably contain a $L1_0$-based ordered alloy. Further, the $L1_0$-based ordered alloy preferably includes Fe and Pt. The $L1_0$-based ordered alloy may further contain at least one element selected from the group consisting of Ni, Mn, Cr, Cu, Ag, and Au.

Another example of means for achieving the objects of the present invention is providing a perpendicular magnetic recording medium including a non-magnetic substrate; a first magnetic recording layer; and a second magnetic recording layer which are formed in this order, in which the first magnetic recording layer has a granular structure that includes first magnetic crystal grains and a first non-magnetic crystal grain boundary that surrounds the first magnetic crystal grains, the first magnetic crystal grains containing an ordered alloy, and the first non-magnetic crystal grain boundary containing C, and the second magnetic recording layer has a granular structure that includes second magnetic crystal grains and a second non-magnetic crystal grain boundary that surrounds the second magnetic crystal grains, the second magnetic crystal grains containing an ordered alloy, and the second non-magnetic crystal grain boundary containing Ge oxides.

Here, the second non-magnetic crystal grain boundary may further contain at least one oxide selected from the group consisting of Mn oxides, Si oxides, Al oxides, Zn oxides, B oxides, and Ti oxides. Moreover, at least one of the first and second magnetic crystal grains preferably contains a $L1_0$-based ordered alloy. Further, the $L1_0$-based ordered alloy preferably contains Fe and Pt. The $L1_0$-based ordered alloy may further contain at least one element selected from the group consisting of Ni, Mn, Cr, Cu, Ag, and Au.

According to the present invention, it is possible to provide a perpendicular magnetic recording medium in which magnetic crystal grains are micronized to be sufficiently ordered and separated. According to the present invention, it is possible to provide a perpendicular magnetic recording medium having a high magnetic anisotropy constant Ku. According to the present invention, it is possible to provide a perpendicular magnetic recording medium having high coercivity Hc.

Further, in the present invention, when a magnetic recording layer having magnetic crystal grains containing Mn in particular and a non-magnetic crystal grain boundary containing Ge oxides is employed, it is possible to decrease a magnetic reversal field by decreasing the Curie temperature and to facilitate heat-assisted recording.

Moreover, when a granular layer containing a grain boundary material mainly composed of C (carbon) is formed, a granular layer containing oxides mainly composed of Ge is formed thereon, and different materials are added to the magnetic crystal grains of these layers, it is possible to decrease a heat-assisted recording temperature and to reduce a magnetic reversal field. Moreover, it is possible to increase a magnetic reversal field gradient.

BRIEF DESCRIPTION OF THE DRAWINGS

FIG. 4 illustrates temperature dependence of a magnetic reversal field according to Example 4 (chain line) and Example 5 (solid line).

DETAILED DESCRIPTION OF THE INVENTION

Figure 1:
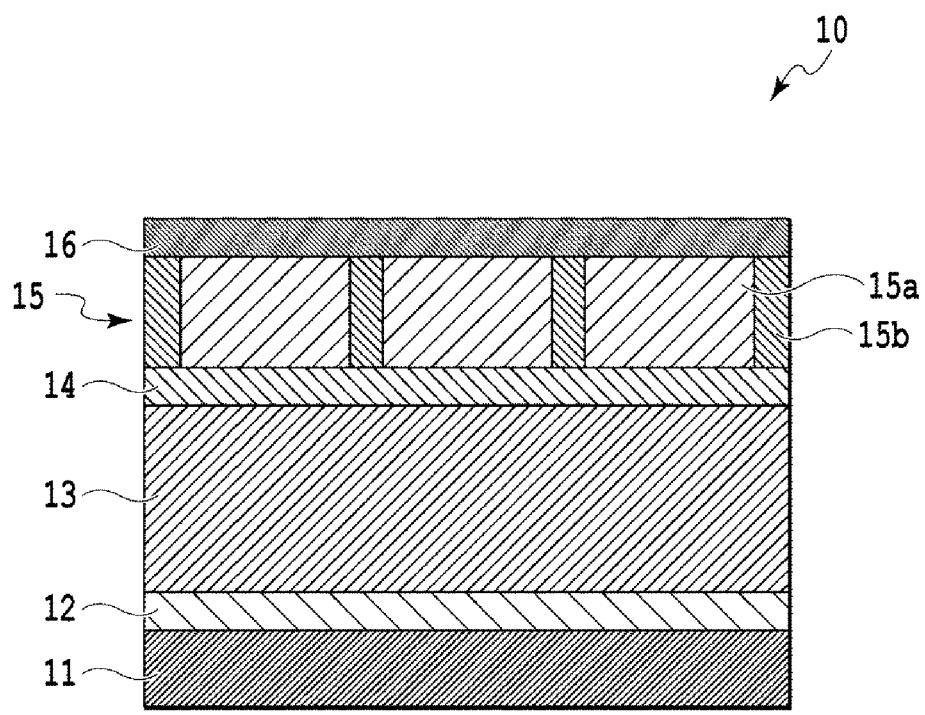
FIG. 1 is a schematic cross-sectional view illustrating a configuration example of a perpendicular magnetic recording medium according to the present invention.

FIG. 1 is a schematic cross-sectional view illustrating a configuration example of a perpendicular magnetic recording medium according to the present invention.

A perpendicular magnetic recording medium 10 includes an adhesion layer 12, an underlayer 13, a seed layer 14, a magnetic recording layer 15, and a protective layer 16 which are formed on a non-magnetic substrate 11 in that order. In the present invention, the adhesion layer 12, the underlayer 13, the seed layer 14, and the protective layer 16 are layers formed optionally.

Various substrates having a flat surface can be used as the non-magnetic substrate 11. For example, the non-magnetic substrate 11 can be formed using materials (NiP-plated Al alloy, reinforced glass, crystallized glass, or the like) which are generally used in a magnetic recording medium. In the example illustrated below, all substrates used as the non-magnetic substrate 11 are glass substrates. However, the examples illustrated below do not limit the material of the non-magnetic substrate according to the present invention.

The adhesion layer 12 is a layer for securing adhesion between two layers between which the adhesion layer is inserted. In the configuration example of FIG. 1, the adhesion layer 12 is inserted between the non-magnetic substrate 11 and the underlayer 13. The material for forming the adhesion layer 12 can be selected from metals such as Ta, Ni, W, Cr, or Ru and alloys containing these metals. The adhesion layer may be a single layer and may have a stacked structure including a plurality of layers.

A soft magnetic underlayer (not illustrated) may be optionally provided on the adhesion layer 12. The soft magnetic underlayer controls a magnetic flux generated from a magnetic head to improve read/write properties of the perpendicular magnetic recording medium. A material for forming the soft magnetic underlayer includes crystalline materials such as a NiFe alloy, a sendust (FeSiAl) alloy, or a CoFe alloy, microcrystalline materials such as FeTaC, CoFeNi, or CoNiP, and amorphous materials including Co alloys such as CoZrNb or CoTaZr. An optimal thickness of the soft magnetic underlayer depends on the structure and properties of a magnetic head used for magnetic recording. When the soft magnetic underlayer is formed continuously with other layers, it is preferable that the soft magnetic underlayer has a thickness in the range of 10 nm and 500 nm (both ends inclusive) from the perspective of balance with productivity.

The underlayer 13 is a layer formed for the purpose of controlling crystallinity or crystal axis orientation of the magnetic recording layer 15 formed thereabove. The underlayer 13 may be a single layer or may have a plurality of layers. The underlayer 13 is preferably a non-magnetic film formed from alloys to which Cr is added or in which at least one element among Mo, W, Ti, V, and Mn are added to the main component Cr or mixtures thereof. Moreover, a material that constitutes the underlayer 13 preferably has approximately the same crystal lattice spacing as the crystal lattice spacing of the magnetic recording layer 15. The material of the underlayer 13 can be preferably selected appropriately according to the composition of the magnetic recording layer 15. The underlayer 13 can be formed using conventional methods such as a DC magnetron sputtering method or an electron beam deposition method.

The seed layer 14 is a layer for securing adhesion between the underlayer 13 and the magnetic recording layer 15 and controlling the size and crystal orientation of the magnetic crystal grains 15a of the magnetic recording layer 15 above the seed layer 14. The seed layer 14 is preferably a non-magnetic layer. The material of the seed layer 14 is appropriately selected in conformity with the material of the magnetic crystal grains 15a. For example, when the magnetic crystal grains 15a are formed of a $L1_0$-based ordered alloy such as FePt or CoPt, the seed layer 14 can be formed from MgO, TiN, NiW, Cr, $SrTiO_3$, $MgAl_2O_4$, or mixtures thereof. The seed layer 14 can be formed using an optional method known in the art such as a sputtering method (including a DC magnetron sputtering method and an RF magnetron sputtering method), a vacuum deposition method, or the like.

Figure 2:
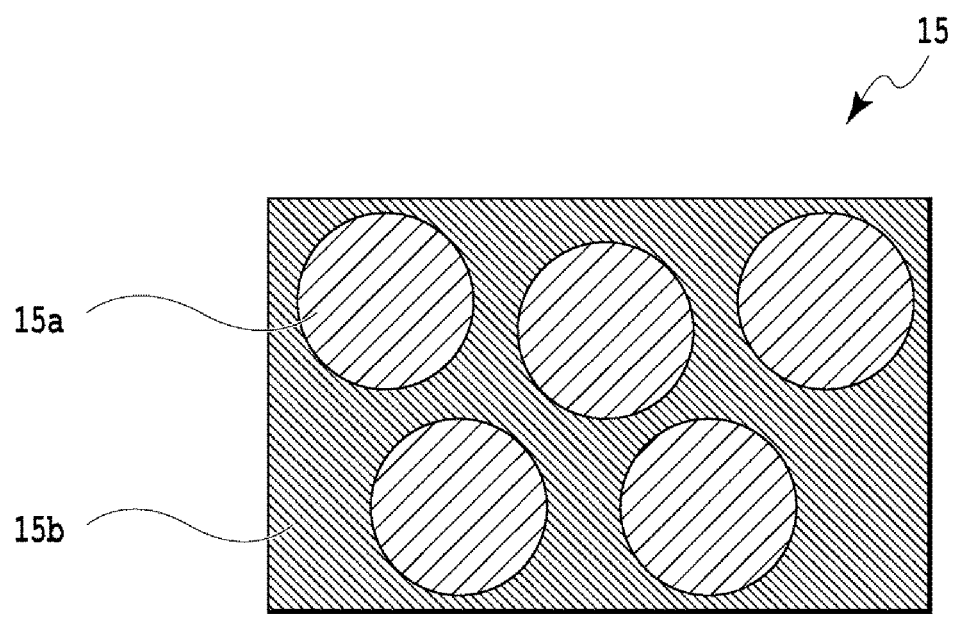
FIG. 2 is a schematic plan view illustrating a configuration example of a magnetic recording layer in the perpendicular magnetic recording medium according to the present invention.

FIG. 2 is a schematic plan view illustrating a configuration example of the magnetic recording layer in the perpendicular magnetic recording medium according to the present invention. The magnetic recording layer 15 has a granular structure in which the magnetic crystal grains 15a are surrounded by the non-magnetic crystal grain boundary 15b.

The magnetic crystal grains 15a are preferably formed from a ferromagnetic material. The magnetic crystal grains 15a are preferably an ordered alloy containing at least one element selected from Fe and Co and at least one element selected from Pt and Pd. For example, a $L1_0$-based ordered alloy such as FePt, FePd, or CoPt. Metal elements such as Ni, Mn, Cr, Cu, Ag, or Au may be added to the magnetic crystal grains 15a for the purpose of modulating the properties of the magnetic crystal grains 15a. When Ni, Mn, or Cr is added, since magnetic interaction is reduced and magnetic properties such as a magnetic anisotropy and a Curie temperature can be changed, desired magnetic properties can be obtained. Moreover, when Cu, Ag, or Au is added, it is possible to reduce an ordering temperature and to improve the magnetic anisotropy.

All atoms of the magnetic crystal grains may not have an ordered structure. A degree of order S indicating the degree of an ordered structure may be equal to or larger than a predetermined value. The degree of order S is calculated by the ratio of a measured value obtained by measuring a magnetic recording medium using an X-ray diffractometer (XRD) and a theoretical value when the magnetic crystal grains are completely ordered. For example, in the case of a $L1_0$-based ordered alloy, the degree of order S is calculated using an integrated intensity of (001) and (002) peaks derived from the ordered alloy. The degree of order S can be obtained by dividing the ratio of the measured integrated intensity of (002) peak to the measured integrated intensity of (001) peak by the ratio of the integrated intensity of (002) peak to the integrated intensity of (001) peak, calculated theoretically when the magnetic crystal grains are completely ordered. When the degree of order S obtained in this manner is 0.5 or larger, the magnetic recording medium has a practical magnetic anisotropy constant Ku.

Ge oxides are used as the non-magnetic crystal grain boundary 15b. The Ge oxides are oxides represented by Ge $(M_1, M_2, \ldots )O_x$. $M_1, M_2, \ldots$ are Si or Al, for example. Typical examples of the Ge oxides include $GeO_2$, $GeSiO_2$, and $GeAlO_2$. Preferably, the Ge oxides are oxides that mainly contain Ge, which means that Ge occupies 50% or more of the group of Ge, $M_1, M_2, \ldots$. Preferably, a composition ratio of the magnetic crystal grains 15a and the non-magnetic crystal grain boundary 15b is that (magnetic crystal grains 15a):(non-magnetic crystal grain boundary 15b)=80:20 to 50:50. This is because a high magnetic anisotropy is obtained if the ratio of the magnetic crystal grains 15a is 50 vol % or more and the ratio of the non-magnetic crystal grain boundary 15b is 50 vol % or smaller. This is also because magnetic crystal grains are sufficiently separated if the ratio of the magnetic crystal grains 15a is 80 vol % or smaller and the ratio of the non-magnetic crystal grain boundary 15b is 20 vol % or more. When the configuration of bit-patterned media (BPM) is employed to prioritize a reduction of magnetic interaction between recording bits, the ratio of the magnetic crystal grains 15a may be smaller than 50 vol %.

Since Ge has high electronegativity, Ge oxides and preferably oxides that mainly contain Ge are more likely to having covalent cross-linking than conventional granular materials. Due to this, it is possible to reduce the influence of oxygen to Fe and Pt, for example, that constitute an ordered alloy. Ge oxides do not impair the ordering of ordered alloys, and as a result, it is possible to create an ordered structure in low-temperature deposition. Further, since Ge oxides have a low melting point and have small surface energy, Ge oxides can be formed at the boundaries of magnetic crystal grains and can separate magnetic crystal grains sufficiently.

The non-magnetic crystal grain boundary 15b may further contain at least one selected from the group consisting of Mn oxides, Si oxides, Al oxides, Zn oxides, B oxides, and Ti oxides. When these oxides are contained, since covalency and surface energy can be adjusted, it is possible to further improve magnetic anisotropy and/or to further improve separability of magnetic crystal grains.

Here, in particular, when a magnetic recording layer having magnetic crystal grains containing Mn and a non-magnetic crystal grain boundary containing Ge oxides is employed, it is possible to decrease a magnetic reversal field due to a decreased Curie temperature and to facilitate heat-assisted recording. That is, when Mn is added to magnetic crystal grains which are combined with a non-magnetic crystal grain boundary containing Ge oxides, temperature dependence of a magnetic reversal field Hsw changes greatly near the Curie temperature and the magnetic reversal field becomes equal to or lower than a recording magnetic field generated by a magnetic head. Thus, it is possible to perform heat-assisted recording at a remarkably lower temperature than the conventional art. Moreover, temperature gradient of the magnetic reversal field increases at this temperature region, and recording resolution during heat-assisted recording can be improved.

The thickness of the magnetic recording layer 15 is preferably between 4 nm and 16 nm and is typically 10 nm. This is because it is possible to secure a magnetic moment amount required for signal reproduction if the thickness of the magnetic recording layer 15 is 4 nm or more. This is also because magnetizations can be reversed coherently if the thickness of the magnetic recording layer 15 is 16 nm or smaller. This is particularly because continuity of magnetic crystal grains is maintained if the magnetic recording layer 15 is formed in a single layer.

The protective layer (protective film) 16 can be formed using a material mainly composed of carbon that is generally used in the field of magnetic recording media. Moreover, the protective layer 16 may be a single layer or may have a stacked structure. The stacked structure may have a stacked structure of two kinds of carbon-based materials having different properties, a stacked structure of metal and a carbon-based material, or a stacked structure of a metal oxide film and a carbon-based material, for example. The protective layer 16 can be formed using a CVD method, a sputtering method (including a DC magnetron sputtering method), a vacuum deposition method, or the like.

Moreover, optionally, the perpendicular magnetic recording medium of the present invention may further include a liquid lubricant layer (not illustrated) formed on the protective layer 16. The liquid lubricant layer can be formed using a material (for example, a perfluoropolyether-based lubricant or the like) that is generally used in the field of perpendicular magnetic recording media. The liquid lubricant layer can be formed using a coating method such as, for example, a dip coating method, a spin coating method, or the like.

Figure 3:
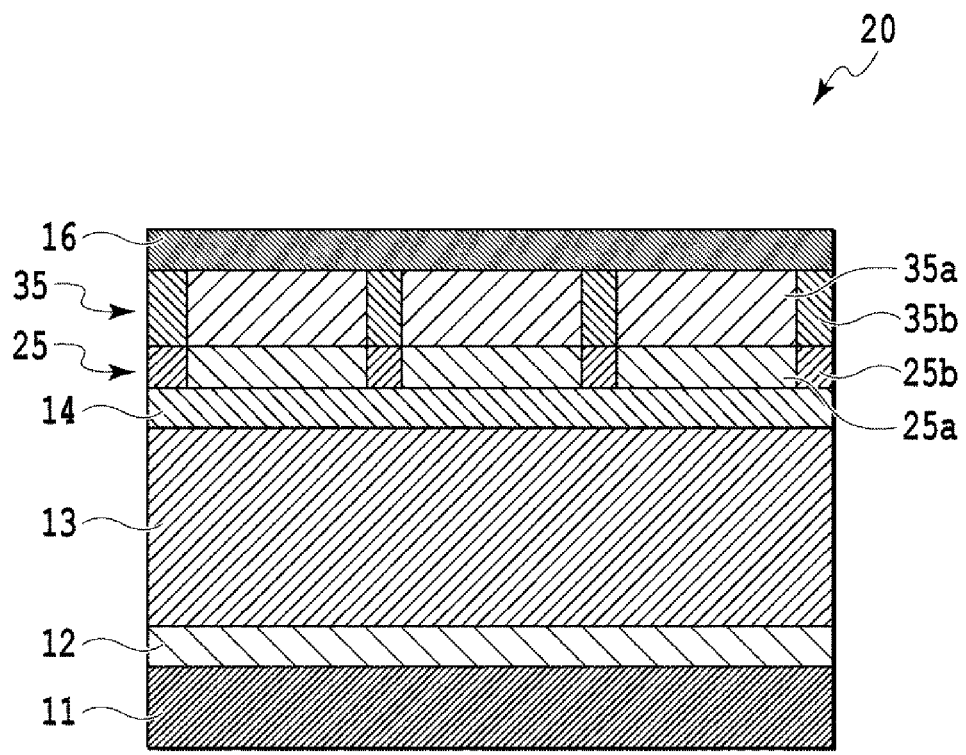
FIG. 3 is a schematic cross-sectional view illustrating another configuration example of the perpendicular magnetic recording medium according to the present invention.

FIG. 3 is a schematic cross-sectional view illustrating another configuration example of the perpendicular magnetic recording medium according to the present invention.

A perpendicular magnetic recording medium 20 includes an adhesion layer 12, an underlayer 13, a seed layer 14, a first magnetic recording layer 25, a second magnetic recording layer 35, and a protective layer 16 which are formed on a non-magnetic substrate 11 in that order. In FIG. 3, layers formed from the same materials as the layers of FIG. 1 will be denoted by the same reference numerals and description thereof will not be provided.

The first magnetic recording layer 25 has a granular structure having first magnetic crystal grains 25a and a first non-magnetic crystal grain boundary 25b that surrounds the first magnetic crystal grains 25a. The first magnetic crystal grains 25a contain an ordered alloy and the first non-magnetic crystal grain boundary 25b contains C.

The first magnetic crystal grains 25a are preferably an ordered alloy that contains at least one element selected from Fe and Co and at least one element selected from Pt and Pd. For example, a $L1_0$-based ordered alloy such as FePt, FePd, or CoPt. The first magnetic crystal grains 25a are preferably formed from a ferromagnetic material. Metal elements such as Ni, Mn, Cr, Cu, Ag, or Au may be added to the first magnetic crystal grains 25a. The advantages obtained by adding these metal elements are the same as the case of the first magnetic crystal grains 15a.

Materials containing C (carbon) are used as the first non-magnetic crystal grain boundary 25b. Preferably, a composition ratio of the first magnetic crystal grains 25a to the first non-magnetic crystal grain boundary 25b is that (first magnetic crystal grains 25a):(first non-magnetic crystal grain boundary 25b)=80:20 to 50:50. This is because a high magnetic anisotropy is obtained if the ratio of the first magnetic crystal grains 25a is 50 vol % or more and the ratio of the first non-magnetic crystal grain boundary 25b is 50 vol % or smaller. This is also because magnetic crystal grains are sufficiently separated if the ratio of the first magnetic crystal grains 25a is 80 vol % or smaller and the ratio of the first non-magnetic crystal grain boundary 25b is 20 vol % or more. When the configuration of bit-patterned media (BPM) is employed to prioritize a reduction of magnetic interaction between recording bits, the ratio of the first magnetic crystal grains 25a may be smaller than 50 vol %.

The thickness of the first magnetic recording layer 25 is preferably between 1 nm and 4 nm and is typically 2 nm. This is because magnetic crystal grains are ordered sufficiently if the thickness of the first magnetic recording layer 25 is 1 nm or more. This is also because regrowth of magnetic crystal grains does not occur if the thickness of the first magnetic recording layer 25 is 4 nm or smaller. Particularly, the first magnetic recording layer 25 having the first non-magnetic crystal grain boundary 25b formed from C is preferable because it allows continuous growth of the magnetic crystal grains of the second magnetic recording layer 35 that contains Ge oxides and that is disposed above the first magnetic recording layer 25.

The second magnetic recording layer 35 has a granular structure having second magnetic crystal grains 35a and a second non-magnetic crystal grain boundary 35b that surrounds the second magnetic crystal grains 35a. The second magnetic crystal grains 35a contain an ordered alloy and the second non-magnetic crystal grain boundary 35b contains Ge oxides. Since the second magnetic recording layer 35, the second magnetic crystal grains 35a, and the second non-magnetic crystal grain boundary 35b may employ the same configuration as that of the magnetic recording layer 15, the magnetic crystal grains 15a, and the non-magnetic crystal grain boundary 15b, respectively, description thereof will not be provided. The thickness of the second magnetic recording layer 35 is preferably set to be smaller than when the second magnetic recording layer 35 is formed in a single layer taking into consideration the fact that the first magnetic recording layer 25 is also formed.

The first magnetic crystal grains 25a and the second magnetic crystal grains 35a may be formed from different materials. For example, when different materials are used so that the upper and lower layers have different Curie temperatures Tc, it is possible to decrease the heat-assisted recording temperature and to decrease the magnetic reversal field during recording while maintaining the magnetic properties and the granular structure of the entire stacked magnetic recording layer. Moreover, it is possible to increase the magnetic reversal field gradient. For example, the first magnetic crystal grains 25a may be formed from a $L1_0$-based ordered alloy that contains CoPt and the second magnetic crystal grains 35a may be formed from a $L1_0$-based ordered alloy that contains FePt. Alternatively, different metal materials such as Ni, Mn, Cr, Cu, Ag, or Au may be added to the respective magnetic crystal grains. For example, the first magnetic recording layer 25 is formed as a FePt granular layer that includes FePt, a material Y added for the purpose of controlling a Curie temperature Tc of FePt, and a grain boundary material mainly composed of C (carbon). Further, the second magnetic recording layer 35 is formed as a FePt granular layer that includes FePt, a material X added for the purpose of controlling a Curie temperature Tc of FePt, and oxides mainly composed of Ge. In this case, when different additive materials X and Y are used, different effects of controlling the Curie temperature Tc can be obtained in the upper and lower layers.

Here, in particular, when Mn is added to the second magnetic recording layer, it is possible to decrease a magnetic reversal field due to a decreased Curie temperature and to facilitate heat-assisted recording. That is, when Mn is added to magnetic crystal grains which are combined with a non-magnetic crystal grain boundary containing Ge oxides, temperature dependence of a magnetic reversal field Hsw changes greatly near the Curie temperature and the magnetic reversal field becomes equal to or lower than a recording magnetic field generated by a magnetic head. Thus, it is possible to perform heat-assisted recording at a remarkably lower temperature than the conventional art. Moreover, temperature gradient of the magnetic reversal field increases at this temperature region, and recording resolution during heat-assisted recording can be improved.

Another magnetic layer may be disposed in addition to the magnetic recording layer 15, the first magnetic recording layer 25, and the second magnetic recording layer 35 so as to further improve the performance of the magnetic recording medium. In the following description, a layer including the magnetic recording layer 15, the first magnetic recording layer 25, and the second magnetic recording layer 35 will be collectively referred to simply as a magnetic recording layer.

A Tc control magnetic layer having a different Curie temperature Tc than the magnetic recording layer may be further disposed, and a recording temperature may be set in conformity with the Curie temperatures Tc of both. In this way, it is possible to decrease a magnetic reversal field of the entire magnetic recording medium required during recording. For example, the Curie temperature of the Tc control magnetic layer is set to be lower than the Curie temperature of the magnetic recording layer. When the recording temperature is set to an intermediate value of the Curie temperatures of both, the magnetizations of the Tc control magnetic layer may disappear during recording and the magnetic field required for reversing recording decreases. In this way, it is possible to reduce a magnetic field generated during recording, required for a magnetic recording head and to obtain satisfactory magnetic recording properties.

The Tc control magnetic layer may be disposed above or below the magnetic recording layer. The Tc control magnetic layer preferably has a granular structure. Particularly preferably, the magnetic crystal grains of the magnetic recording layer are disposed approximately at the same position as the magnetic crystal grains of the Tc control magnetic layer. When the magnetic crystal grains of both layers are approximately at the same position, it is possible to improve performance such as signal-to-noise ratio (SNR).

The magnetic crystal grains that form the Tc control magnetic layer preferably is a material containing at least one element among Co and Fe and preferably further contains at least one element among Pt, Pd, Ni, Mn, Cr, Cu, Ag, and Au. For example, CoCr-based alloys, CoCrPt-based alloys, FePt-based alloys, FePd-based alloys, and the like can be used. The crystal structure of the magnetic crystal grains may have an ordered structure such as $L1_0$, $L1_1$, or $L1_2$-type structure, a hexagonal close packed (hcp) structure, a face centered cubic (fcc) structure, and the like.

Examples of the material of the non-magnetic crystal grain boundary that forms the Tc control magnetic layer include the Ge oxide, oxides such as $SiO_2$ or $TiO_2$, nitrides such as SiN or TiN, C, and B.

A layer formed from the same material as the magnetic recording layer but having a different composition may be used as the Tc control magnetic layer. For example, a layer in which the ratio of Ge oxides in the magnetic recording layer is changed, a layer in which the material such as Mn oxides added to the non-magnetic crystal grain boundary is changed, a layer in which an element such as Ni added to the ordered alloy is changed, and the like may be used as the Tc control magnetic layer.

In order to adjust magnetic exchange coupling between the magnetic recording layer and the Tc control magnetic layer, an exchange coupling control layer is preferably disposed between the magnetic recording layer and the Tc control magnetic layer. By adjusting magnetic exchange coupling at a recording temperature, it is possible to adjust the magnetic reversal field. The exchange coupling control layer can selectively be a magnetic layer and a non-magnetic layer according to desired exchange coupling. A non-magnetic layer is preferably used in order to enhance the effect of decreasing a magnetic reversal field at a recording temperature.

A Ku control magnetic layer having a uniaxial crystal magnetic anisotropy constant Ku different from the magnetic recording layer may be disposed to set appropriate magnetic exchange coupling between both layers. In this way, it is possible to improve thermal stability of the entire magnetic recording medium required for preserving recorded states.

The Ku control magnetic layer may be disposed above or below the magnetic recording layer. The Ku control magnetic layer preferably has a granular structure. Particularly preferably, the magnetic crystal grains of the magnetic recording layer are disposed approximately at the same position as the magnetic crystal grains of the Ku control magnetic layer. When the magnetic crystal grains of both layers are approximately at the same position, it is possible to improve performance such as signal-to-noise ratio (SNR).

The magnetic crystal grains that form the Ku control magnetic layer preferably is a material containing at least one element among Co and Fe and preferably further contains at least one element among Pt, Pd, Ni, Mn, Cr, Cu, Ag, and Au. For example, CoCr-based alloys, CoCrPt-based alloys, FePt-based alloys, FePd-based alloys, and the like can be used. The crystal structure of the magnetic crystal grains may have an ordered structure such as $L1_0$, $L1_1$, or $L1_2$-type structure, a hexagonal close packed (hcp) structure, a face centered cubic (fcc) structure, and the like.

Examples of the material of the non-magnetic crystal grain boundary that forms the Ku control magnetic layer include the Ge oxide, oxides such as $SiO_2$ or $TiO_2$, nitrides such as SiN or TiN, C, and B.

A layer formed from the same material as the magnetic recording layer but having a different composition may be used as the Ku control magnetic layer. For example, a layer in which the ratio of Ge oxides in the magnetic recording layer is changed, a layer in which the material such as Mn oxides added to the non-magnetic crystal grain boundary is changed, a layer in which an element such as Ni added to the ordered alloy is changed, and the like may be used as the Ku control magnetic layer.

In order to adjust magnetic exchange coupling between the magnetic recording layer and the Ku control magnetic layer, an exchange coupling control layer is preferably disposed between the magnetic recording layer and the Ku control magnetic layer. By adjusting magnetic exchange coupling at a recording temperature, it is possible to adjust the magnetic reversal field. The exchange coupling control layer can selectively be a magnetic layer and a non-magnetic layer according to desired exchange coupling. A non-magnetic layer is preferably used in order to enhance the effect of decreasing a magnetic reversal field at a recording temperature.

A cap layer may be disposed as another magnetic layer. A layer which is magnetically continuous within the magnetic layer may be disposed above or below the magnetic recording layer. By disposing this continuous magnetic layer, it is possible to adjust magnetization reversal of the magnetic recording medium.

The material that forms the continuous magnetic layer is preferably a material containing at least one element among Co and Fe and may further contain at least one element among Pt, Pd, Ni, Mn, Cr, Cu, Ag, Au, and rare-earth elements. For example, CoCr-based alloys, CoCrPt-based alloys, FePt-based alloys, FePd-based alloys, CoSm-based alloys, and the like can be used. The continuous magnetic layer may be a polycrystalline layer or an amorphous layer. When the continuous magnetic layer is a polycrystalline layer, the crystal structure may have a hexagonal close packed (hcp) structure, a face centered cubic (fcc) structure, or an ordered structure such as $L1_0$, $L1_1$, or $L1_2$-type structure, and the like.

The respective magnetic layers have an action of maintaining magnetizations corresponding to information (for example, 0 or 1) that is to be recorded in cooperation with the magnetic recording layer at a temperature where recorded data is preserved and/or an action of facilitating recording in cooperation with the magnetic recording layer at the recording temperature. In order to attain this object, a magnetic layer other than the Tc control magnetic layer, the Ku control magnetic layer, and the continuous magnetic layer may be added. For example, a magnetic layer for controlling recording properties such as a magnetic layer for controlling a magnetic reversal field, a magnetic layer for controlling a coercivity Hc, or a magnetic layer for controlling a saturation magnetization Ms, a magnetic layer for controlling a ferromagnetic resonance frequency for microwave assisted magnetic recording, and other layers may be added. Moreover, the added magnetic layer may be a single layer, and alternatively, different layers having different compositions may be stacked.

EXAMPLES

A perpendicular magnetic recording medium was formed, in which a Ta-based adhesion layer, a Cr-based underlayer, a MgO-based seed layer, an ordered alloy-type FePt-based magnetic recording layer, and a C-based protective film are sequentially formed on a non-magnetic substrate, according to following procedure.

Example 1

A chemically reinforced glass substrate (N-10 glass substrate manufactured by HOYA Corporation) was used as the non-magnetic substrate. The layers ranging from the Ta-based adhesion layer to the C-based protective film were formed using an in-line type film forming apparatus without exposing the layers to the atmosphere. A Ta-based adhesion layer having a thickness of 5 nm was formed in an Ar gas atmosphere according to a DC magnetron sputtering method using a pure Ta target. Further, a Cr-based underlayer having a thickness of 20 nm was formed in an Ar gas atmosphere according to a DC magnetron sputtering method using a pure Cr target. Subsequently, a MgO-based seed layer having a thickness of 5 nm was formed according to an RF sputtering method using a MgO target in a state where the substrate was heated to 300° C. When the MgO layer was formed, the pressure of the Ar gas atmosphere was 0.02 Pa and the RF power was 200 W. Subsequently, a FePt—$GeO_2$ layer was formed as a magnetic recording layer in the following manner. Specifically, the substrate was heated to 450° C., and then, the FePt—$GeO_2$ layer having a thickness of 10 nm was formed according to a DC magnetron sputtering method using a target including FePt and $GeO_2$. The target including FePt and $GeO_2$ was adjusted so as to have a composition of 75 vol % of FePt and 25 vol % of $GeO_2$ during deposition. Here, the composition of FePt during deposition was 50 at. % of Fe and 50 at. % of Pt, and vol % represents a volume fraction and at. % represents an atomic fraction. The same is true for the following description unless otherwise stated particularly. When the FePt—$GeO_2$ layer was formed, the pressure of the Ar gas atmosphere was 1.0 Pa and the input DC power was 25 W. Finally, a C-based protective film having a thickness of 3 nm was formed according to a sputtering method.

Example 2

A FePt—C layer was formed as the first magnetic recording layer in the following manner. Specifically, the substrate was heated to 450° C., and then, the FePt—C layer having a thickness of 2 nm was formed according to a DC magnetron sputtering method using a target including FePt and C. The target including FePt and C was adjusted so as to have a composition of 60 vol % of FePt and 40 vol % of C during deposition. When the FePt—C layer was formed, the pressure of the Ar gas atmosphere was 1.0 Pa and the input DC power was 25 W. Subsequently, a FePt—$GeO_2$ layer was formed as the second magnetic recording layer in the following manner. Specifically, the substrate was heated to 450° C., and then, a FePt—$GeO_2$ layer having a thickness of 7 nm was formed according to a DC magnetron sputtering method using a target including FePt and $GeO_2$. The target including FePt and $GeO_2$ was adjusted so as to have a composition of 75 vol % of FePt and 25 vol % of $GeO_2$ during deposition. When the FePt—$GeO_2$ layer was formed, the pressure of the Ar gas atmosphere was 1.0 Pa and the input DC power was 25 W. The other layers were formed using the same method as used in Example 1.

Example 3

Layers were formed using the same method as used in Example 2 except that the FePt—$GeO_2$ layer of Example 2 had a thickness of 3 nm.

Comparative Example 1

A FePt—$SiO_2$ layer was formed instead of the FePt—$GeO_2$ layer of Example 1 in the following manner. Specifically, the substrate was heated to 450° C., and then, a FePt—$SiO_2$ layer having a thickness of 10 nm was formed according to a DC magnetron sputtering method using a target including FePt and $SiO_2$. The target including FePt and $SiO_2$ was adjusted so as to have a composition of 77 vol % of FePt and 23 vol % of $SiO_2$ during deposition. The other layers were formed using the same method as used in Example 1.

Comparative Example 2

A FePt—$TiO_2$ layer was formed instead of the FePt—$GeO_2$ layer of Example 1 in the following manner. Specifically, the substrate was heated to 450° C., and then, a FePt—$TiO_2$ layer having a thickness of 10 nm was formed according to a DC magnetron sputtering method using a target including FePt and $TiO_2$. The target including FePt and $TiO_2$ was adjusted so as to have a composition of 77 vol % of FePt and 23 vol % of $TiO_2$ during deposition. The other layers were formed using the same method as used in Example 1.

Table 1 illustrates test conditions of Examples 1 to 3 and Comparative Examples 1 and 2. The magnetic anisotropy constant Ku was calculated based on R. F. Penoyer, Rev. Sci. Instr., 30 (1959) 711 (Non-Patent Literature 1) and Soshin Chikazumi, "Physics of Ferromagnetism", Vol. II, pp. 10-21, Shokabo, Co., Ltd. (Non-Patent Literature 2) by evaluating magnetic field application angle dependence of spontaneous magnetization using a physical property measurement system (PPMS; manufactured by Quantum Design Inc.). In Table 1, $MO_2$ represents $GeO_2$, $SiO_2$, or $TiO_2$. The notation FePt—$GeO_2$/FePt—C means the FePt—$GeO_2$ layer is an upper layer and the FePt—C layer is a lower layer. Moreover, the fact that the magnetic recording layers of Examples 1 to 3 and Comparative Examples 1 and 2 had an intended $L1_0$-based ordered structure was confirmed based on the presence of a superlattice line (001) using X-ray diffraction (XRD).

TABLE 1

| | Magnetic recording layer | Pressure (Pa) | C content (vol %) | MO$_2$ Content (vol %) | FePt—C thickness (nm) | FePt—MO$_2$ thickness (nm) | Total thickness (nm) | Ku (×10$^7$ erg/cm$^3$) | Hc (kOe) ([ ]: (×10$^6$ A/m)) |
|---|---|---|---|---|---|---|---|---|---|
| Example 1 | FePt—GeO$_2$ | 1 | — | 25 | — | 10 | 10 | 1.0 | 11.4 [0.91] |
| Example 2 | FePt—GeO$_2$/ FePt—C | 1 | 40 | 25 | 2 | 7 | 9 | 2.2 | 15.7 [1.25] |
| Example 3 | FePt—GeO$_2$/ FePt—C | 1 | 40 | 25 | 2 | 3 | 5 | 2.1 | 17.53 [1.39] |
| Comparative Example 1 | FePt—SiO$_2$ | 3 | — | 23 | — | 10 | 10 | 0.8 | 8.2 [0.65] |
| Comparative Example 2 | FePt—TiO$_2$ | 3 | — | 23 | — | 10 | 10 | 0.4 | 5.0 [0.40] |

In Example 1, the magnetic anisotropy constant Ku was increased to 1.0×10$^7$ erg/cm$^3$ (=1.0×10$^6$ J/cm$^3$) as compared to Comparative Examples 1 and 2. Moreover, the coercivity Hc was also increased. These improvements results from acceleration of micronization and ordering of magnetic crystal grains. In this manner, when Ge oxides were used as the non-magnetic crystal grain boundary, both the magnetic anisotropy constant Ku and the coercivity Hc had high values. The effects of Ge oxides are superior to those of other oxides, which are not easily predictable from other literature. In Example 2, since the FePt—GeO$_2$ layer was formed above the FePt—C layer, the magnetic anisotropy constant Ku was further increased to 2.2×10$^7$ erg/cm$^3$, the coercivity Hc was increased, and micronization was further accelerated. In Example 3, since the thickness of the FePt—GeO$_2$ layer was decreased, the magnetic anisotropy constant Ku was 2.1×10$^7$ erg/cm$^3$ which was equal to that of Example 2, and the coercivity Hc was also increased. This is because separation of magnetic crystal grains was further accelerated. In this manner, when the FePt—GeO$_2$ layer was formed above the FePt—C layer, both the magnetic anisotropy constant Ku and the coercivity Hc had remarkably high values. The effects of the magnetic recording layer containing C and the magnetic recording layer containing Ge oxides above the magnetic recording layer are remarkably superior to those of other oxides, which are not easily predictable from other literature.

Comparative Example 3

Comparative Example 3 is an example in which a FePt-oxide layer as a second magnetic recording layer is formed on a FePt—C template layer as a first magnetic recording layer. Examples of the oxides that form the oxide layer include SiO$_2$, TiO$_2$, Ta$_2$O$_5$, Al$_2$O$_3$, NiO, and MnO. The layer is configured such that the upper layer has a thickness of 3 nm and a composition of 75 vol % of FePt and 25 vol % of oxide layer, and the lower layer has a thickness of 2 nm and a composition of 60 vol % of FePt and 40 vol % of C. In Comparative Example 3, the other layers were formed using the same method as used in Example 3 except that the FePt-oxide layer having a thickness of 3 nm was formed as the second magnetic recording layer.

TABLE 2

| | Types of oxides | | | | | |
|---|---|---|---|---|---|---|
| | SiO$_2$ | TiO$_2$ | Ta$_2$O$_5$ | Al$_2$O$_3$ | NiO | MnO |
| Magnetic anisotropy constant Ku (×10$^7$ erg/cm$^3$) | 1.8 | 1.3 | 0.8 | 1.5 | 0.3 | 1.4 |

In Comparative Example 3, all magnetic recording media had lower magnetic anisotropy constants Ku as compared to Example 3, which demonstrates the effects of Ge oxides.

Example 4

A FePtMn—C layer was formed as the first magnetic recording layer in the following manner. Specifically, the substrate was heated to 450° C., and then, a FePtMn—C layer having a thickness of 2 nm was formed according to a DC magnetron sputtering method using a target including FePtMn and C. The target including FePtMn and C was adjusted so as to have a composition of 60 vol % of FePtMn (35 at. % of Fe, 50 at. % of Pt, and 15 at. % of Mn) and 40 vol % of C during deposition. When the FePtMn—C layer was formed, the pressure of the Ar gas atmosphere was 1.0 Pa and the input DC power was 25 W. Subsequently, a FePt—GeO$_2$ layer was formed as the second magnetic recording layer in the following manner. Specifically, the substrate was heated to 450° C., and then, a FePt—GeO$_2$ layer having a thickness of 7 nm was formed according to a DC magnetron sputtering method using a target including FePt and GeO$_2$. The target including FePt and GeO$_2$ was adjusted so as to have a composition of 75 vol % of FePt (50 at. % of Fe and 50 at. % of Pt) and 25 vol % of GeO$_2$ during deposition. When the FePt—GeO$_2$ layer was formed, the pressure of the Ar gas atmosphere was 1.0 Pa and the input DC power was 25 W. The other layers were formed using the same method as used in Example 1.

Example 5

A FePt—C layer was formed as the first magnetic recording layer in the following manner. Specifically, the substrate was heated to 450° C., and then, a FePt—C layer having a thickness of 2 nm was formed according to a DC magnetron sputtering method using a target including FePt and C. The target including FePt and C was adjusted so as to have a composition of 60 vol % of FePt (50 at. % of Fe and 50 at. % of Pt) and 40 vol % of C. When the FePt—C layer was formed, the pressure of the Ar gas atmosphere was 1.0 Pa and the input DC power was 25 W. When the composition of FePt of the obtained film was analyzed, the composition ratio was 50.5 at. % of Fe and 49.5 at. % of Pt. Subsequently, a FePtMn—$GeO_2$ layer was formed as the second magnetic recording layer in the following manner. Specifically, the substrate was heated to 450° C., and then, a FePtMn—$GeO_2$ layer having a thickness of 7 nm was formed according to a DC magnetron sputtering method using a target including FePtMn and $GeO_2$. The target including FePtMn and $GeO_2$ was adjusted so as to have a composition of 80 vol % of FePtMn (35 at. % of Fe, 50 at. % of Pt, and 15 at. % of Mn) and 20 vol % of $GeO_2$ during deposition. When the FePtMn—$GeO_2$ layer was formed, the pressure of the Ar gas atmosphere was 1.0 Pa and the input DC power was 25 W. When the composition of FePtMn of the obtained film was analyzed, the composition ratio was 36.9 at. % of Fe, 50.4 at. % of Pt, and 12.7 at. % of Mn. The other layers were formed using the same method as used in Example 1.

Table 3 illustrates the measurement results of magnetic properties. FIG. 4 illustrates the measurement results of temperature dependence of a magnetic reversal field.

TABLE 3

| | Magnetic properties | | | | | | | |
|---|---|---|---|---|---|---|---|---|
| Magnetic recording layer | | Pressure (Pa) | C content (vol %) | $GeO_2$ Content (vol %) | First magnetic layer thickness (nm) | Second magnetic layer thickness (nm) | Total thickness (nm) | Ts (° C.) | Hc (kOe) ([ ]: ×$10^6$ A/m)) |
| Example 4 | FePt—$GeO_2$/ FePtMn—C | 1 | 40 | 25 | 2 | 7 | 9 | 450 | 17.5 [1.39] |
| Example 5 | FePtMn—$GeO_2$/ FePt—C | 1 | 40 | 20 | 2 | 7 | 9 | 450 | 17.1 [1.36] |

The coercivity Hc of Example 5 is approximately the same as that of Example 4, and the FePt granular structure and the magnetic properties did not show great difference. The temperature dependence of the magnetic reversal field Hsw of Example 4 shows that 350° C. or higher is preferable for heat-assisted recording. The respective values of magnetic reversal field Hsw in ×$10^6$ A/m units can be calculated by multiplying the kOe values with ¼π. In Example 4, since the magnetic reversal field changes gradually at high temperatures, a magnetic reversal field gradient associated with temperature gradient decreases. On the other hand, temperature dependence of the magnetic reversal field Hsw of Example 5 changes greatly at the Curie temperature (280° C.) of FePtMn, and the magnetic reversal field is equal to or smaller than the recording magnetic field (12 kOe) generated by the magnetic head. Thus, heat-assisted recording can be performed at 280° C. or below. Moreover, since the magnetic reversal field changes abruptly with temperature, a magnetic reversal field gradient associated with temperature gradient is large.

It can be understood from Example 5 that when Mn was added to the FePt—$GeO_2$ layer, the magnetic reversal field of the magnetic recording layer can be changed with temperature so that a magnetic head can easily record data. On the other hand, in Example 4, although the effect of Mn addition appeared in relation to the change with temperature of the magnetic reversal field of the FePt—C layer, since the first magnetic recording layer to which Mn was added is as thin as 2 nm, the effect of Mn addition was small in relation to the change with temperature of the entire magnetic recording layer. The effect on temperature properties of Mn addition to the FePt—C layer having an increased thickness will be remarkable.

What is claimed is:

1. A perpendicular magnetic recording medium, comprising, in the order recited:
   a non-magnetic substrate;
   a first magnetic recording layer which has a granular structure that includes first magnetic crystal grains and a first non-magnetic crystal grain boundary that surrounds the first magnetic crystal grains, the first magnetic crystal grains containing an ordered alloy and the first non-magnetic crystal grain boundary containing C; and
   a second magnetic recording layer which has a granular structure that includes second magnetic crystal grains and a second non-magnetic crystal grain boundary that surrounds the second magnetic crystal grains, the second magnetic crystal grains containing an ordered alloy and the second non-magnetic crystal grain boundary consisting of $GeO_2$.

2. The perpendicular magnetic recording medium according to claim 1, wherein at least one of the first and the second magnetic crystal grains contains a $L1_0$-based ordered alloy.

3. The perpendicular magnetic recording medium according to claim 2, wherein the $L1_0$-based ordered alloy contains Fe and Pt.

4. The perpendicular magnetic recording medium according to claim 3, wherein the $L1_0$-based ordered alloy further contains at least one element selected from the group consisting of Ni, Mn, Cr, Cu, Ag, and Au.

* * * * *